United States Patent [19]

Jordan et al.

[11] 3,890,200

[45] June 17, 1975

[54] SELECTIVE MEDIUM FOR STREPTOCOCCUS MUTANS

[75] Inventors: Harold V. Jordan, Wellesley; Johannes Van Houte, Concord, both of Mass.

[73] Assignee: Forsyth Dental Infirmary for Children, Boston, Mass.

[22] Filed: June 14, 1973

[21] Appl. No.: 369,803

[52] U.S. Cl. .......................... 195/103.5 R; 195/100
[51] Int. Cl. ................................................ C12k 1/06
[58] Field of Search ............ 195/103.5 R, 100, 121, 195/122, 123

[56] References Cited
OTHER PUBLICATIONS

Syed et al., Applied Microbiology, October, 1972, pp. 638–644, Vol. 24, No. 4.

*Primary Examiner*—Lionel M. Shapiro
*Attorney, Agent, or Firm*—Richard P. Crowley

[57] ABSTRACT

A selective medium was developed for the isolation of *Streptococcus mutans* from human dental plaque. Mitis-salivarius agar was modified by adding 0.2 units/ml bacitracin and by increasing the sucrose concentration to 20 percent. The selective agents allowed the undiminished recovery of *Strep.mutans* with maximum inhibition of the balance of the streptococcal flora normally encountered on this medium.

20 Claims, No Drawings

SELECTIVE MEDIUM FOR STREPTOCOCCUS MUTANS

BACKGROUND OF THE INVENTION

The association of *Streptococcus mutans* with dental caries was first reported by Clarke (1924) who isolated the organism, frequently in pure culture, from the depth of carious lesions. In recent years this organism has become the subject of considerable investigation since its caries-inducing potential was demonstrated in animal models (Fitzgerald, Jordan and Stanley, 1960; Fitzgerald and Keyes, 1960). Studies which are concerned with elucidating the etiologic role of *strep. mutans* in dental caries, have been hampered, however, by the lack of convenient and reliable techniques for the recognition and enumeration of the organism in human dental plaque. A method generally used involves the culturing of plaque samples on mitis-salivarius agar which is selective for streptococci (Krasse, 1966; Jordan, Krasse and Moeller, 1968). It is possible to differentiate *Strep. mutans* from the other streptococci on this medium on the basis of its unique colonial appearance. This procedure can be tedious when large numbers of samples are involved. Furtheremore, the presence of *Strep. mutans* cannot be established on this medium with any degree of reliability when it constitutes only a small percentage of the total streptococcal flora.

Special media for the selective cultivation of *Strep. mutans* have been described previously. Carlsson (1967) has described a medium containing sulfadimetine which is based on the relative resistance of this species to the sulfa drugs. Ikeda and Sandham (1972) have reported the selective growth of *Strep. mutans* on mitis-salivarius agar containing 40 percent sucrose. However the concentration of these agents that had to be used for the selection of *Strep. mutans* either did not completely inhibit other organisms or partially inhibited *Strep. mutans*. The relative resistance of *Strep. mutans* to high concentrations of sucrose has been reported (Gehring, 1968; Ikeda and Sandham, 1972).

Bacitracin sensitivity has been used as a differential characteristic in classification schemes for the streptococci (Colman, 1968). Lancefield group D streptococci (Lancefield, 1933) are relatively resistant to the action of bacitracin (Toala, et al., 1969). Although *Strep. mutans* does not react with group D antiserum, this species shares many characteristics of *Streptococcus bovis* (de Stoppelaar, van Houte and de Moor, 1967). Carlsson (1968) has reported that 7 out of 9 *Strep. mutans* strains (78 percent) were resistant to 5 units/ml of bacitracin. Seventy-nine percent of the other streptococcal strains similarly tested were sensitive to bacitracin.

SUMMARY OF THE INVENTION

Our invention concerns a novel and unique medium for the selective growth of *Streptococcus mutans*, the process of preparing and using the medium, and the use of the medium in a caries susceptibility test. In particular, our invention relates to a selective medium for *Strep. mutans* which employs a combination in an agar *Strep. mutans* medium of a saccharide compound and an antibiotic compound in concentrations sufficient to inhibit the growth of interfering organisms, but insufficient to permit the growth of *Strep. mutans*. More particularly, our invention is directed to a selective medium of mitis-salivarius agar containing a combination of sucrose and bacitracin.

DESCRIPTION OF THE EMBODIMENTS

The development of our selective medium for *Strep. mutans* was conducted in three phases. (1) Mitis-salivarius agar (Difco) was investigated for its adequacy to allow full recovery of *Strep. mutans*. (2) Selective agents were tested separately utilizing pure cultures to a determine optimal concentrations for suppression of other streptococci without inhibition of *Strep. mutans*. (3) The medium containing a combination of selective agents at optimal concentrations was evaluated for its ability to support selective recovery of *Strep. mutans* from human dental plaque.

Culture Media

Mitis-salivarius agar (MS) was tested with one or more of the following additions in an attempt to increase the recovery of *Strep. mutans* grown as pure cultures: Phytone (BBL), Polypeptone (BBL), Bacto Peptone (Difco), Myosate (BBL), Trypitcase (BBL), all at 1 percent concentration; Beef extract (Difco) at 0.3 percent and yeast extract (Difco) at 0.2 percent. The inhibitors, crystal violet, trypan blue and potassium tellurite in MS agar were also tested for their effect on the growth of pure cultures of *Strep. mutans* by their successive deletion from the medium.

The recovery of *Strep. mutans* from dental plaque was compared on heart infusion agar (Difco) with 5 percent sucrose and 5 percent difibrinated sheep blood, MM10 medium (Syed and Loesche, 1972), MS agar and the selective medium developed.

Selective Agents

Representative *Strep. mutans* strains and strains of other oral streptococci were tested to determine the optimal concentration of selective agents that would allow undiminished recovery of the former and maximal suppression of the latter.

Sucrose (Fisher Scientific Co.) was incorporated into MS agar before sterilization over a range of 10 to 40 percent W/V. Bacitracin was incorporated in MS agar in increasing concentrations from 0.06 to 2.0 units/ml of the medium after sterilization. The bacitracin stock solution was made up in sterile distilled water under aseptic conditions with a minimum of agitation.

Microorganisms

One representative from each of the five serological groups of *Strep. mutans* (Bratthall, 1970) was used for the development of the medium. These were stains AHT (Zinner, et al., 1965), FA-1 (Fitzgerald, Jordan and Stanley, 1960), NCTC 10449 (Edwardsson, 1968), SL-1 (Fitzgerald and Jordan, 1968) and B2 (Edwardsson, 1968). In addition to the above *Strep. mutans* strains the following laboratory strains were used: *Streptococcus sanguis* No. H4 and *Streptococcus salivarius* No. H5, both isolated from human dental plaque, *Streptococcus mitis* No. 26 (Liljemark and Gibbons, 1972) and *Streptococcus faecalis* N83.

Pure Culture Studies

Pure cultures were grown and maintained in trypticase soy broth (BBL). Cultures were grown under an atmosphere of 95 percent nitrogen and 5 percent carbon dioxide for 18 hrs. Ten-fold dilutions were made in 9 ml phosphate buffer 0.067 M, pH 7.2. Duplicate samples of 0.1 ml were plated from $10^{-6}$ and $10^{-7}$ dilutions and spread on the surface of the medium with sterile bent glass rod.

Plaque Sampling

Pooled plaque samples were collected from approximal tooth surfaces of 12–14 yr.-old school children using sterile dental floss. The floss was immediately placed in a small screw-capped vial containing 3 ml of VMG II transport medium (Moeller, 1966). The vials were agitated on a Vortex test tube mixer (Scientific Industries Inc., Springfield, Mass.) for 30 sec in order to dislodge the plaque from the floss and to obtain a homogeneous suspension. Ten-fold dilutions of the suspensions were made in 0.05 percent yeast extract water. Duplicate 0.1 ml samples of the dilutions were plated and spread on the medium with a sterile bent glass rod.

All plates from pure culture and plaque sampling studies were incubated under an atmosphere of 95 percent nitrogen and 5 percent nitrogen and 5 percent carbon dioxide for 24 hrs at 37°C. After incubation the plates were allowed to stand at room temperature for 24 hrs. The plates were then examined at a magnification of 15X using a wide field dissecting microscope.

Enumeration and Identification

Total counts were determined using the Quebec colony counter. Strep. mutans colonies were identified and counted under the dissecting microscope on plates with 30–300 colonies whenever possible. Colonial characteristics of Strep. mutans on blood agar with sucrose and MM10 agar were similar to the appearance of this species on MS agar ad described by Krasse (1966). Representative colonies typical of Strep. mutans as well as those whose identity as Strep. mutans was doubtful were subcultured to test the ability of the stains to ferment mannitol and sorbitol and to determine their colonial morphology on MS agar.

Initial experiments with representative strains of Strep. mutans suggested that MS agar was nutritionally adequate and noninhibitory for this species. Comparable colony counts were obtained on MS agar with and without the inhibitory agents, crystal violet, trypan blue and tellurite, which are usually incorporated in this medium. No increase in colony counts was observed when phytone, polypeptone, bacto peptone, myosate, trypticase, beef extract or yeast extract were added to MS agar. Pure cultures of Strep. mutans and dental plaque samples cultured in parallel on MS agar and on other rich nonselective media showed no advantage of the latter over MS agar. Some examples of the results from experiments in which MS agar was compared to heat infusion agar with 5 percent defibrinated sheep blood and 5 percent sucrose are shown in Table 1. The data indicate that the recovery of Strep. mutans from dental plaque samples was similar on both media. In further studies of the development of a selective medium for Strep. mutans MS agar was therefore used as a basal medium.

Studies with five strains of Strep. mutans representing the different serotypes demonstrated that all tolerated concentrations of sucrose up to 20 percent in MS agar without any adverse effects on their growth or colonial morphology (Table 2). Strains AHT, FA-1 and NCTC 10449 grew in the presence of sucrose concentrations up to 40 percent with only a moderate decrease in numbers at the higher sucrose levels. However, strains SL-1 and B2 were more sensitive to the higher sucrose concentrations. The laboratory strain of Strep. sanguis was completely inhibited at a level of 15 percent sucrose in MS agar. The Strep. salivarius and Strep. mitis laboratory strains were more resistant, being inhibited by 35 percent and 20 percent sucrose respectively.

Pure cultures of Strep. mutans grew on MS agar containing up to 2 units/ml bacitracin, which was the maximum level tested (Table 3). With some of the strains a reduction in numbers was observed above 0.25 units/ml. Strep. salivarius, strain H5 and Strep. mitis, strain 26 were completely inhibited at 0.25 units/ml and 0.125 units/ml respectively. Strep. sanguis, strain H4 was more resistant to bacitracin. Although a gradual reduction in numbers occurred as the bacitracin concentration was increased, complete inhibition was not achieved below 2 units/ml. The data in Table 3 indicate that the optimal concentration of bacitracin which would allow the selective growth of Strep. mutans was between 0.125 and 0.25 units/ml.

On the basis of the data obtained with pure cultures, the recovery of Strep. mutans from human dental plaque samples was studied on MS agar to which 0.05 to 0.2 units/ml of bacitracin were added either singly or in combination with 20 percent sucrose. Each sample was simultaneously cultured on MS agar without additions. As shown with some examples in Table 4, virtually complete inhibition of bacteria other than Strep. mutans was obtained with MS agar containing 20 percent sucrose and 0.2 units/ml bacitracin. Lower concentrations of bacitracin alone or in combination with 20 percent sucrose were not completely effective.

In view of these results the selective medium (MSB) was formulated to contain 0.2 units of bacitracin per ml of medium and 20 percent sucrose and was prepared as follows: To 1,000 ml reconstituted MS agar 150 gms of sucrose was added. The medium was heated to dissolve the components and then autoclaved at 121°C for 15 min. The medium was then cooled to 45°C after which 1 ml each of sterile stock solutions of 1 percent tellurite and 200 units/ml bacitracin was added. The bacitracin solution is stable for one week if stored in the refrigerator. The flask containing the medium was gently swirled to mix the contents thoroughly without foaming. Plates were poured with approximately 20 ml of the medium and then permitted to dry for 24 hrs at room temperature. After drying plates were stored in the refrigerator until use.

The comparative recoveries of Strep. mutans from diluted dental plaque samples cultured in parallel on MM10 agar, MS agar and MSB agar, the selective medium with 20 percent sucrose and 0.2 units/ml bacitracin, are shown in Table 5. No differences were observed in the number of Strep. mutans colonies that could be cultivated on MSB agar as compared to MM10 agar. Colonial morphology of Strep. mutans on the three media was similar. The superiority of MSB agar over MS agar in recovering small numbers of Strep. mutans is clearly demonstrated in the case of plaque sample No. 2. Strep. mutans could not be detected on the crowded MS plate. Bacteria other than Strep. mutans were virtually all inhibited when MSB agar was used. When undiluted plaque samples were cultured MSB agar was clearly superior to the other two media. Confluent bacterial growth on MM10 agar and MS agar prevented detection of Strep. mutans colonies. Other experiments involving dental plaque, saliva and samples from the dorsum of the tongue from many different subjects have shown that even a few colony-forming units of Strep. mutans present in total populations of $10^7$ to $10^8$ bacteria can be easily detected on the MSB medium.

Occasionally enterococci and yeasts were encountered when undiluted samples of plaque from advanced dentinal lesions, saliva or samples from the dorsum of the tongue were cultured. The colonies of the enterococci were dark blue to brown and flat while the yeasts appeared as large white to light blue matte colonies. All were easily differentiated from Strep. mutans by colonial appearance. A laboratory strain of Strep. faecalis (N83) was capable of uninhibited growth on MSB medium.

Previous selective media relied on single selective agents to which Strep. mutans was relatively resistant. In contrast, the present work was based on the assumption that different selective agents for Strep. mutans exhibiting different inhibitory actions could be utilized to complement each other. This approach might permit the use of the individual agents in combination whereby concentrations of each agent noninhibitory to Strep. mutans would be sufficient to obtain complete suppression of other bacteria.

Optimal levels of sucrose and bacitracin were determined with pure cultures on the basis of maximum inhibition of other streptococci without inhibition of Strep. mutans. At the optimal sucrose concentration (20 percent) finally selected, Strep. sanguis and Strep. mitis were effectively inhibited but Strep. lcws Salivarius was not completely suppressed. In contrast, the optimal concentration of bacitracin selected (0.2 units/ml) was sufficient for the complete elimination of Strep. salivarius and Strep. mitis but studies with pure cultures indicated that Strep. sanguis was not completely inhibited at this concentration. Neither of these agents at their optimal levels interfered with the growth of Strep. mutans. A combination of sucrose and bacitracin incorporated in MS agar at the optimal levels determined as above was effective in inhibiting bacteria other than Strep. mutans when human dental plaque samples were cultured.

Mitis-salivarius agar seemed a logical starting point for the development of a selective medium for the isolation of Strep. mutans since the medium is already selective for the streptococci and because the colonial appearance of Strep. mutans is quite distinctive on this medium. In addition, mitis-salivarius agar is commercially available which would assure its ready accessibility, particularly to smaller laboratories with limited facilities for medium preparation.

To date the only interfering organisms detected on MSB agar have been low numbers of enterococci and yeasts which developed when undiluted samples from various sites in the mouth, and plaques from children with advanced dentinal lesions were cultured. These organisms are rarely encountered in routine plaque sampling at the dilutions commonly employed and are easily differentiated on the basis of their colonial morphology. Thus they should not constitute a problem in the routine use of the selective medium.

Development of a selective medium for Strep. mutans allows the isolation of this species from samples when present in low numbers relative to the total population. Studies on the transmission, epidemiology and general ecology of this species should be more feasible now than with the less sensitive cultural methods previously available. In fact, it may be necessary to re-evaluate previous studies on the presence and distribution of Strep. mutans in human populations (Krasse, et al., 1968; Jordan, Englander and Lim, 1969; de Stoppelaar, van Houte and Backer Dirks, 1969). Also, the scope of these clinical studies can be significantly expanded since a reliable selective medium should permit the processing of larger numbers of samples by less skilled personnel.

Our invention has been disclosed in the examples for the purposes of illustration only for the selective growth of the Streptococcus mutans strain on an agar medium containing a combination of sucrose and bacitracin. It is within the scope of our invention that other medium-containing combinations of other antibiotics and other saccharides may be prepared for the selective growth and isolation of other oganisms, such as other strains of streptococcus.

Suitable antibiotics which may be employed include polypeptide antibiotics, such as bacitracin, which inhibit the growth of interfering organisms while not impeding the growth of the selective organisms; for example, other strains of Bacillus subtilis.

Suitable saccharides include, but are not limited to, the mono and dis saccharides which inhibit the growth of the interfering organisms, while not impeding the growth of the selective organisms. The disaccharide sucrose is commonly used, but monosaccharides which develop higher osmotic pressures can be used. Other sucrose-like materials are known to those in the art.

The particular medium selected for our examples was a mitis-salivarius agar medium which is readily available as a commercial culture medium, and which is particularly selective for the growth of the mutans strain of streptococci. However, it is recognized and within the scope of our invention to employ any medium, such as a solid agar medium, which is selective for growth of the desired organism.

The particular concentration range and the optimum concentration of the saccharide and the antibiotic may vary, depending on the particular organism which is selective for growth. The identification of the optimum concentration levels to be used is easily ascertained by a single experimentation as illustrated for the combination of sucrose and bacitracin. Typically, the saccharide range may vary from about 5 to 50 percent, while the antibiotic range may vary from about 0.01 to 5.0, such as 0.05 to 2.0 units/ml.

Our selective medium provides the dentist and others with a simple caries susceptibility test in that culturing a sample from any part of the oral cavity, including saliva, may indicate the patient's susceptibility to caries.

Table 1

Comparative recoveries of Streptococcus mutans from human dental plaque on blood agar and mitis-salivarius agar

| Plaque Number | Blood Agar | Mitis-salivarius Agar |
|---|---|---|
| 1 | 63* | 83 |
| 2 | 380 | 430 |
| 3 | 53 | 50 |
| 4 | 45 | 41 |
| 5 | 58 | 67 |

*Mean number of Strep.mutans colonies on duplicate plates from 0.1 ml of a $10^{-3}$ dilution of plaque collected in VMG II transport medium. Individual counts never exceeded ± 13% of the mean.

Table 2

Effect of sucrose on pure cultures of oral streptococci

| Sucrose concentration (%) in mitis-salivarius agar | Strep.mutans AHT | FA-1 | 10449 | SL-1 | B2 | Strep. sanguis H4 | Strep. salivarius H5 | Strep. mitis 26 |
|---|---|---|---|---|---|---|---|---|
| 5  | 169* | 279 | 88 | 30 | 100 | 43 | 127 | 132 |
| 10 | 184 | 298 | 92 | 25 | 105 | 37 | 123 | 69 |
| 15 | 164 | 235 | 95 | 41 | 108 | 0 | 128 | 46 |
| 20 | 161 | 269 | 95 | 45 | 108 | 0 | 106 | 0 |
| 25 | 181 | 120 | 69 | 28 | 110 | 0 | 39 | 0 |
| 30 | 126 | 156 | 80 | 32 | 91 | 0 | 1 | 0 |
| 35 | 96 | 107 | 71 | 12 | 0 | 0 | 0 | 0 |
| 40 | 91 | 102 | 73 | 0 | 0 | 0 | 0 | 0 |

*Mean number of colonies on duplicate plates from 0.1 ml of a $10^{-6}$ dilution Table 3

Effect of bacitracin on pure cultures of oral streptococci

| Bacitracin concentration (units/ml) in mitis-salivarius agar | Strep.mutans AHT | FA-1 | 10449 | SL-1 | B2 | Strep. sanguis H4 | Strep. salivarius H5 | Strep. mitis 26 |
|---|---|---|---|---|---|---|---|---|
| 0      | 235* | 200 | 236 | 62 | 125 | 184 | 36 | 170 |
| .0625  | 232 | 191 | 231 | 58 | 119 | 110 | 28 | 103 |
| 0.125  | 262 | 196 | 220 | 60 | 107 | 109 | 18 | 0 |
| 0.25   | 237 | 191 | 197 | 51 | 112 | 97 | 0 | 0 |
| 0.5    | 245 | 182 | 212 | 35 | 72 | 82 | 0 | 0 |
| 1      | 214 | 181 | 194 | 42 | 82 | 8 | 0 | 0 |
| 2      | 205 | 58 | 183 | 35 | 75 | 0 | 0 | 0 |

*Mean number of colonies on duplicate plates from 0.1 ml of a $10^{-6}$ dilution Table 4

Selective recovery of Strep.mutans from human dental plaque on mitis-salivarius agar containing various concentrations of bacitracin and sucrose

| Additions to mitis-salivarius agar | Plaque Number 1 Strep. mutans | Other bacteria | 2 Strep. mutans | Other bacteria | 3 Strep. mutans | Other bacteria | 4 Strep. mutans | Other bacteria | 5 Strep. mutans | Other bacteria |
|---|---|---|---|---|---|---|---|---|---|---|
| None | N.D. | >300 | N.D. | >300 | N.D. | >300 | N.D. | >300 | N.D. | >300 |
| 0.05 unit/ml Bacitracin and 20% sucrose | >300 | >100 | >300 | 35* | >300 | 7 | >300 | 13 | N.D. | >1000 |
| 0.1 unit/ml Bacitracin | N.D. | >300 | >300 | 93 | >300 | 80 | >300 | 100 | N.D. | >300 |
| 0.1 unit/ml Bacitracin and 20% sucrose | >300 | 80 | >300 | 43 | >300 | 7 | >300 | 27 | N.D. | >300 |
| 0.2 unit/ml Bacitracin | N.D. | >300 | >300 | 60 | >300 | 57 | >300 | 65 | N.D. | >300 |
| 0.2 unit/ml Bacitracin and 20% sucrose | >300 | 0 | >300 | 0 | >300 | 0 | >300 | 0 | 1 | 7 |

*Mean number of colonies on duplicate plates from 0.1 ml of VMG II transport medium containing plaque material
N.D. Not detectable, plates too crowded Table 5

Comparative recoveries of Strep.mutans from human dental plaque on MM 10 agar, mitis-salivarius agar (MS) and MS with sucrose and bacitracin (MSB)

| Plaque Number | MM 10 Strep. mutans | Other bacteria | MS Strep. mutans | Other bacteria | MSB Strep. mutans | Other bacteria |
|---|---|---|---|---|---|---|
| 1 | 3* | 228 | 7 | 96 | 6 | 1 |
| 2 | 26 | >300 | N.D. | >300 | 24 | 0 |
| 3 | 117 | >300 | 106 | >300 | 100 | 0 |
| 4 | 15 | 121 | 12 | 24 | 37 | 0 |
| 5 | 47 | >300 | 46 | >300 | 40 | 0 |

* Mean number of colonies on duplicate plates from 0.1 ml of a $10^{-3}$ dilution of plaque in VMG II transport medium. Individual counts of Strep.mutans varies less than ± 30% from the mean except in plaque number 1 (±50%) due to the low numbers of Strep.mutans.
N.D. Not detectable, plates too crowded

REFERENCES

1. Bratthall, D. 1970. Demonstration of five serological groups of streptococcal strains resembling Streptococcus mutans. Odont. Revy 21, 143–152.
2. Carlsson, J. 1968. A numerical taxonomic study of human oral streptococci. Odont. Revy 19, 137–160.
3. Carlsson, J. 1967. A medium for isolation of Streptococcus mutans. Archs oral Biol. 12, 1657–1658.
4. Clarke, J. K. 1924. On the bacterial factor in the aetiology of dental caries. Brit. J. Exptl. Pathol. 5, 141–147.
5. Colman, G. 1968. The application of computers to the classification of streptococci. J. Gen. Microbiol. 50, 149–158.

6. Edwardsson, S. 1968. Characteristics of caries-inducing human streptococci resembling *Streptococcus mutans*. Archs oral Biol. 13, 637–646.
7. Fitzgerald, R. J. and Jordan, H. V. 1968. Polysaccharide producing bacteria and caries. In: "Art and Science of Dental Caries Research" pp. 79–86 (edited by Harris, R. S.) Academic Press, New York.
8. Fitzgerald, R. J., Jordan, H. V. and Stanley, H. R. 1960. Experimental caries and gingival pathologic changes in the gnotobiotic rat. J. Dent. Res. 39, 923–935.
9. Fitzgerald, R. J. and Keyes, P. H. 1960. Demonstration of the etiologic role of streptococci in experimental caries in the hamster. J. Amer. Dent. Assoc. 61, 9–19.
10. Gehring, G. 1968. Uber das Wachstum einiger Zahnplaque-streptokokken auf fester und in flussigen Nahrmedien mit verschiedenen zuckerkonzentrationen. Dt. Zahnarztl. Z. 23, 914–923.
11. Ikeda, T. and Sandham, H. J. 1972. A high sucrose medium for the identification of *Streptococcus mutans*. Archs oral Biol. 17, 781–783.
12. Jordan, H. V., Englander, H. R. and Lim, S. 1969. Potentially cariogenic streptococci in selected population groups in the western hemisphere. J. Amer. Dent. Assoc. 78, 1131–1135.
13. Jordan, H. V., Krasse, B. and Moller, A. 1968. A method of sampling human dental plaque for certain "caries-inducing" streptococci. Archs oral Biol. 13, 919–927.
14. Krasse, B. 1966. Human streptococci and experimental caries in hamsters. Archs oral Biol. 11, 429–436.
15. Krasse, B., Jordan, H. V., Edwardsson, S., Svensson, I. and Trell, L. 1968. The occurrence of certain "caries-inducing" streptococci in human dental plaque material. Archs oral Biol. 13, 911–918.
16. Lancefield, R. C. 1933. A serological differential of human and other groups of hemolytic streptococci. J. Exptl. Med. 57, 571–595.
17. Liljemark, W. F. and Gibbons, R. J. 1972. Proportional distribution and relative adherence of *Streptococcus miteor* (*mitis*) on various surfaces in the human oral cavity. Infect. and Immun. 6, 852–859.
18. Moeller, A. J. R. 1966. Microbiological examination of root canals and periapical tissues of human teeth. Odont. Tidskr 74, No. 5–6, special article.
19. de Stoppelaar, J. D., van Houte, J. and Backer Dirks, O. 1969. The relationship between extracellular polysaccharide-producing streptococci and smooth surface caries in 13-yr.-old children. Caries Res. 3, 190–199.
20. de Stoppelaar, J. D., van Houte, J. and DeMoor, C. E. 1967. The presence of dextran forming bacteria resembling *Streptococcus bovis* and *Streptococcus sanguis* in human dental plaque. Archs oral Biol. 12, 1,199–1,201.
21. Syed, S. A. and Loesche, W. J. 1972. Survival of human dental plaque flora in various transport media. Appl. Microbiol. 24, 638–644.
22. Toala, P., McDonald, A., Wilcox, C. and Finland, M. 1969. Susceptibility of Group D Streptococcus (enterococcus) to 21 antibiotics in vitro, with special reference to species differences. Amer. J. Med. Sci. 258, 416–430.
23. Zinner, D., Jablon, J., Aran, A. and Saslaw, M. 1965. Experimental caries induced in animals by streptococci of human origin. Proc. Soc. Exp. Biol. 118, 766–770.

We claim:

1. A selective medium composition for the growth of *Streptococcus mutans*, which composition comprises in combination:
   a. a solid medium selective to induce the growth of the *Streptococcus mutans*;
   b. the solid medium containing therein a combination of a
      i. mono or di saccharide compound; and
      ii. a polypeptide antibiotic compound comprising bacitracin, the saccharide and antibiotic compounds present in a concentration insufficient to prevent the growth of *Streptococcus mutans*, but sufficient to prevent the growth in sufficient quantity of interfering microorganisms.

2. The composition of claim 1 wherein the saccharide compound is a mono saccharide compound of sucrose, fructose or glucose.

3. The composition of claim 1 wherein the solid medium is a mitis-salivarius agar medium.

4. The composition of claim 1 wherein the concentration for saccharide is from about 5 to 50 percent, and the concentration of the antibiotic is from about 0.01 to 5.0 units/ml.

5. A selective medium for the growth of *Streptococcus mutans*, such as from human dental plaque, which medium comprises:
   a mitis-salivarius agar medium containing in combination a noninhibiting amount of sucrose and bacitracin, but an amount sufficient of each to inhibit the growth of interfering organisms.

6. The medium of claim 5 wherein the bacitracin is present in an amount of from 0.05 to 0.25 units/ml and the sucrose is present in an amount of about 20 percent by weight.

7. The medium of claim 5 wherein the bacitracin is present in an amount of from 0.125 to 0.250 units/ml.

8. The medium of claim 5 wherein the sucrose is present in amounts up to about 20 percent by weight.

9. The medium of claim 5 wherein the sucrose is present in an amount of about 20 percent by weight and the bacitracin in an amount of about 0.20 units/ml.

10. The method of selective growth of a *streptococcus mutans*, which method comprises:
    a. providing a medium composition which comprises:
       i. a medium selective to induce the growth of the *streptococcus mutans*;
       ii. the medium containing therein a combination of a: mono or di saccharide compound; and a polypeptide antibiotic compound comprising bacitracin, the saccharide and antibiotic compounds present in a concentration insufficient to prevent the growth of the *Streptococcus mutans*, but sufficient to prevent the growth in sufficient quantity of interfering microorganisms;
    b. inoculating the medium with the selected microorganism; and
    c. culturing such microorganism in the medium.

11. The method of claim 10 wherein the saccharide compound is a mono saccharide compound of sucrose, fructorse or glucose.

12. The method of claim 10 wherein the medium is a mitissalivarius agar medium.

13. The method of claim 10 wherein the concentration for saccharide is from about 5 to 50 percent, and the concentration of the antibiotic is from about 0.01 to 5.0 units/ml.

14. A method for the growth and isolation of *Streptococcus mutans*, which method comprises:
   a. providing a medium of a modified mitis-salivarius-type agar which contains in combination a noninhibiting amount to the growth of *Streptococcus mutans* of sucrose and bacitracin, and an inhibiting amount to the growth of interfering organisms:
   b. inoculating the medium with a source of *Streptococcus mutans;* and
   c. growing and isolating the *Streptococcus mutans* on the medium free of interfering organisms.

15. The method of claim 14 wherein the medium is inoculated with a sample of *Streptococcus mutans* from dental plaque.

16. The method of claim 14 where the sucrose is present in an amount of 15 percent up to 40 percent by weight, and the bacitracin in an amount of about 0.05 to 0.25 units/ml.

17. The method of claim 14 wherein the sucrose is present in an amount of from about 20 percent by weight, and the bacitracin in an amount of about 0.2 units/ml.

18. The method of claim 14 which includes determining the extent of growth of *Streptococcus mutans* to provide an indication of the susceptibility of the patient to caries by culturing a sample from any part of the oral cavity, including saliva.

19. The method of claim 10 which includes obtaining a sample from the oral cavity of a patient and inoculating the medium with such sample, and identifying the presence of *Streptococcus mutans* from the growth of such microorganism after culturing.

20. The method of claim 19 wherein the sample is obtained from human dental placque.

* * * * *

UNITED STATES PATENT OFFICE
CERTIFICATE OF CORRECTION

PATENT NO. : 3,890,200
DATED : June 17, 1975
INVENTOR(S) : Harold V. Jordan et al It is certified that error appears in the above-identified patent and that said Letters Patent are hereby corrected as shown below:

After the "ABSTRACT" and before the "BACKGROUND OF THE INVENTION", insert the following paragraph:

--The invention described herein was made in the course of work under a grant or award from the Department of Health, Education and Welfare.--

Signed and Sealed this sixteenth Day of December 1975

[SEAL]

Attest:

RUTH C. MASON
Attesting Officer

C. MARSHALL DANN
Commissioner of Patents and Trademarks